(12) United States Patent
Kellermann et al.

(10) Patent No.: US 10,028,326 B2
(45) Date of Patent: Jul. 17, 2018

(54) COEXISTENCE MANAGEMENT OF BLUETOOTH WITH WLAN

(71) Applicant: Bayerische Motoren Werke Aktiengesellschaft, Munich (DE)

(72) Inventors: Helmut Kellermann, Oberschleissheim (DE); Martin Arend, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/411,334

(22) Filed: Jan. 20, 2017

(65) Prior Publication Data

US 2017/0135146 A1 May 11, 2017

Related U.S. Application Data

(63) Continuation of application No. PCT/EP2015/057222, filed on Apr. 1, 2015.

(30) Foreign Application Priority Data

Jul. 23, 2014 (DE) .................. 10 2014 214 422

(51) Int. Cl.
*H04B 7/00* (2006.01)
*H04W 76/15* (2018.01)
*H04W 76/02* (2009.01)
*H04W 88/06* (2009.01)
*H04W 84/12* (2009.01)

(52) U.S. Cl.
CPC ......... *H04W 76/15* (2018.02); *H04W 76/025* (2013.01); *H04W 84/12* (2013.01); *H04W 88/06* (2013.01)

(58) Field of Classification Search
CPC .................. H04W 76/025; H04W 88/06
See application file for complete search history.

(56) References Cited

U.S. PATENT DOCUMENTS 8,908,667 B1 * 12/2014 Wong ................. H04B 1/04
370/327
2002/0061031 A1    5/2002 Sugar et al.
(Continued)

FOREIGN PATENT DOCUMENTS

EP          2 605 553 A2      6/2013
EP          2605553 A2   *    6/2013

OTHER PUBLICATIONS

PCT/EP2015/057222, International Search Report dated Jul. 6, 2015 (Three (3) pages).

(Continued)

*Primary Examiner* — Nay A Maung
*Assistant Examiner* — Angelica M Perez
(74) *Attorney, Agent, or Firm* — Crowell & Moring LLP

(57) ABSTRACT

A method for setting up and operating a multiple communication link in a wireless communication apparatus, which includes a first wireless transceiver and a second wireless transceiver, includes setting up a first communication link according to an IEEE standard 802.15.1 using the first wireless transceiver. The method also includes setting up a second communication link according to an IEEE standard 802.11 using the second wireless transceiver, and setting up a third communication link according to an IEEE standard 802.15.1 using the first wireless transceiver, on a channel of the second communication link. Moreover, the method includes simultaneously operating the first communication link, the second communication link and the third communication link, wherein the second communication link and the third communication link are both simultaneously operated on the same channel of the second communication link.

11 Claims, 3 Drawing Sheets

(56) References Cited

U.S. PATENT DOCUMENTS

| | | |
|---|---|---|
| 2004/0029619 A1 | 2/2004 | Liang et al. |
| 2005/0191964 A1 | 9/2005 | Hundal |
| 2008/0310332 A1 | 12/2008 | Hansen et al. |
| 2012/0177024 A1 | 7/2012 | Maekawa et al. |
| 2013/0052955 A1 | 2/2013 | Tamura |
| 2013/0157566 A1 | 6/2013 | Oguchi |
| 2014/0119252 A1 | 5/2014 | Kella et al. |
| 2015/0237505 A1* | 8/2015 | Su .................. H04W 16/14 370/330 |

OTHER PUBLICATIONS

German Search Report issued in German counterpart application No. 10 2014 214 422.1 dated Mar. 3, 2015, with Statement of Relevancy (Ten (10) pages).

IEEE 802.15.2™0 2003. "Part 15.2: Coexistence of Wireless Personal Area Networks with Other Wireless Devices Operating in Unlicensed Frequency Bands", Aug. 28, 2003, 126 total pages.

Balasundaram Subbusendaram et al., "System Implementation of Pushing DATA to Handheld Devices via Bluetooth High Speed Specification. Version 3.0 + HS", Wireless Communications Networking and Mobile Computing (WICOM), 2010 6$^{th}$ International Conference on, IEEE, Piscataway, NJ, USA, Sep. 23, 2010, pp. 1 -4, XP031828420.

Barr et al., "Bluetooth SIG Liasion Report; 15-10-0329-00-0000-bluetooth-sig-liasion-report", IEEE Draft; 15-10-0329-00-0000-Bluetooth-Sig-Liasion-Report, IEEE-SA Mentor, Piscataway, NJ, USA, vol. 802.15WG, May 18, 2010, pp. 1-8, XP017665687.

\* cited by examiner

COEXISTENCE MANAGEMENT OF BLUETOOTH WITH WLAN

CROSS REFERENCE TO RELATED APPLICATIONS

This application is a continuation of PCT International Application No. PCT/EP2015/057222, filed Apr. 1, 2015, which claims priority under 35 U.S.C. § 119 from German Patent Application No. 10 2014 214 422.1, filed Jul. 23, 2014, the entire disclosures of which are herein expressly incorporated by reference.

BACKGROUND AND SUMMARY OF THE INVENTION

The present invention relates to a method for setting up and operating a multiple communication link in a wireless communication apparatus, a communication apparatus to this effect, and a motor vehicle equipped to this effect.

Bluetooth 3.0+HS is a refinement of Bluetooth 2.1, with the HS meaning high speed. For high data transmission rates, an additional wireless local area network (WLAN) transmission channel can be set up. Bluetooth (BT) 2.1 transmits its data via narrow-band channels in the ISM band at 2.4 GHz. To this end, the ISM band is split at 2.4 GHz into 79 channels. So as to retain robustness against interference, the frequency is changed 1,600 times per second, which is described as frequency hopping. Furthermore, said BT channel is designated as the original BT channel. Therefore, a WLAN channel can be set up in addition to the original BT channel by means of Bluetooth 3.0+HS. Hereafter, said WLAN channel is also described as BT-WLAN channel. Thus, BT-WLAN is a WLAN link set up in case of high speed demand on a BT link, comparable to a Bluetooth 3.0+HS standard or higher.

As soon as BT 3.0 sets up a BT-WLAN channel, a separate and independent WLAN link to the apparatus outside of BT 3.0 is currently not possible unless an independent WLAN hardware has been installed twice. A second WLAN hardware causes higher costs. However, if only one independent WLAN hardware has been installed, which is to be used to establish a WLAN link, a BT-WLAN link existing by means of BT 3.0 has to be dropped, or no BT-WLAN link can be set up by means of BT 3.0; consequently, BT 3.0 cannot change into HS mode. This means that WLAN and Bluetooth 3.0 with HS reciprocally block each other or rule each other out.

Therefore, it would be desirable to provide an option that avoids at least one of the known disadvantages of the prior art, or at least minimizes it.

An object of the invention is to propose to the user an even more comfortable and faster data link, in particular also for use in motor vehicles, which avoids at least part of the disadvantages known in the prior art, or at least minimizes them.

This object may be attained by a method for setting up and operating a multiple communication link in a wireless communication apparatus; said wireless communication apparatus comprising: A first wireless transceiver and a second wireless transceiver. The method comprising: Setting up a first communication link according to an IEEE standard 802.15.1 by means of the first wireless transceiver. Setting up a second communication link according to an IEEE standard 802.11 by means of the second wireless transceiver. Setting up a third communication link according to an IEEE standard 802.15.1, by means of the first wireless transceiver, on the channel of the second communication link; and simultaneous operation of the first communication link, the second communication link, and the third communication link, with the second communication link and the third communication link being operated on the same channel.

A multiple communication link in terms of the invention thus may mean a bundling of at least two communication links. Thus, said communication links may appear to the user as one single communication link. Preferably, one of the communication links is a WLAN link and a further of the communication links is a Bluetooth link.

A wireless communication apparatus in terms of the invention thus means a communication apparatus that is suitable for using at least one wireless communication link for data transmission. Preferably, a wireless communication apparatus refers to a pad, a smart phone, a smart watch, smart glasses, a motor vehicle communication apparatus, and the like.

A wireless transceiver in terms of the invention thus refers to an apparatus suitable for wirelessly sending and receiving data.

Simultaneously operating more than one communication link generally requires that each simultaneously operated communication link is respectively operated on a different channel so as to avoid any interference between the communication links.

The teaching according to the invention achieves the advantage that more than one WLAN link can be operated simultaneously with a Bluetooth link by means of only two transceivers. In this way, a higher total data transmission rate can be facilitated for a wireless communication apparatus without having to install an additional cost-increasing transceiver.

The object of a subordinate claim thus relates to a wireless communication apparatus, comprising a first wireless transceiver and a second wireless transceiver, wherein the communication apparatus is set up to execute any one method according to the invention.

The teaching according to the invention achieves the advantage that a wireless communication apparatus can be provided which, by means of two transceivers, can facilitate a higher total data transmission rate than a conventional wireless communication apparatus of this type.

Another advantage is that this can be achieved without significantly increasing the production cost of the wireless communication apparatus.

The object of a further subordinate claim thus relates to a motor vehicle, comprising a wireless communication apparatus, wherein the wireless communication apparatus is set up to execute any one method according to the invention.

Thus, a motor vehicle may be a vehicle driven by means of a combustion motor and/or by means of an electric motor, such as, for example, a motorcycle, a passenger car, a bus, or a truck.

The teaching according to the invention achieves the advantage that a motor vehicle can be provided which, with a wireless communication apparatus having only two wireless transceivers, can facilitate a higher total data transmission rate for the motor vehicle than in a conventional motor vehicle of this type.

Another advantage is that this can be achieved without significantly increasing the production cost of the wireless communication apparatus.

Before describing embodiments of the invention in greater detail hereafter, it shall be first noted that the invention is not limited to the described components or the described method steps. Furthermore, the terminology being used also does not represent any limitation, but is merely of an exemplary nature. In as far as the singular is being used in the description and in the claims, this comprises in each case the plural to the extent that the context does not explicitly exclude this.

In the following, further exemplary embodiments of the first method according to the invention are explained.

According to a first exemplary embodiment of the invention, the method furthermore includes that the first communication link can be operated according to a Bluetooth 2.1 standard or less.

Said embodiment has the advantage that the method can be operated with marketable communication apparatuses that already function reliably, which saves costs. Further, said embodiment has the advantage that already existing communication apparatuses can be cost-efficiently retrofitted for operation with the method because the hardware of such a communication apparatus does not need to be modified.

According to another exemplary embodiment, the method further includes that the third communication link can be operated according to a Bluetooth 3.0 standard or higher.

Said embodiment has the advantage that the method can be operated with marketable communication apparatuses, which saves costs.

Further, the embodiment has the advantage that communication apparatuses can be cost-efficiently retrofitted for operation with the method, which supports a current or future Bluetooth standard because the hardware of such a communication apparatus does not need to be modified.

According to a further exemplary embodiment, the method comprises that the third communication link can be operated on an additional high-speed channel on the basis of WLAN.

Consequently, the third communication link can be operated on the basis of BT-WLAN.

This embodiment has the advantage that the method can be operated with marketable communication apparatuses with high data transmission rate, which saves costs. Further, said embodiment has the advantage that already existing communication apparatuses can be cost-efficiently retrofitted for operation with the method because the hardware of such a communication apparatus does not have to be modified.

According to a further exemplary embodiment, the method furthermore comprises: Splitting the transmission capacity of the same channel on which the second communication link and the third communication link are operated simultaneously, into a first sub-channel with a first partial capacity and into a second sub-channel with a second partial capacity; assigning the first sub-channel to the second communication link; and assigning the second sub-channel to the third communication link.

A sub-channel in terms of the invention thus means a part of a communication channel that can be used separately, which means that a corresponding part of the total channel capacity can be used for said sub-channel, preferably only for said sub-channel. In particular, the channel capacity can be split by temporal staggering.

This embodiment has the advantage that it is now possible for two communication links using the WLAN protocol to share a single channel without interfering with each other.

According to a first exemplary embodiment, the wireless communication apparatus furthermore comprises that the first wireless transceiver is set up to be operated according to an IEEE standard 802.15.1.

This embodiment has the advantage that the wireless communication apparatus can be operated with marketable transceivers, which consequently saves costs.

According to a further exemplary embodiment, the wireless communication apparatus furthermore comprises that the first wireless transceiver is set up to be operated according to Bluetooth 3.0 or higher.

This embodiment has the advantage that the wireless communication apparatus can be operated with marketable and future communication apparatuses with high data transmission rate, which consequently saves costs.

According to a further exemplary embodiment, the wireless communication apparatus furthermore comprises that the second wireless transceiver is set up to be operated according to an IEEE standard 802.11.

This embodiment has the advantage that the wireless communication apparatus can be operated with marketable and future communication apparatuses with high data transmission rate and consequently saves costs.

The invention consequently allows the simultaneous operation of three wireless communication links by means of two wireless transceivers without any interference between the simultaneously operated wireless communication links, and consequently an increase in the total data transmission rate of a wireless communication apparatus equipped with two such wireless transceivers.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
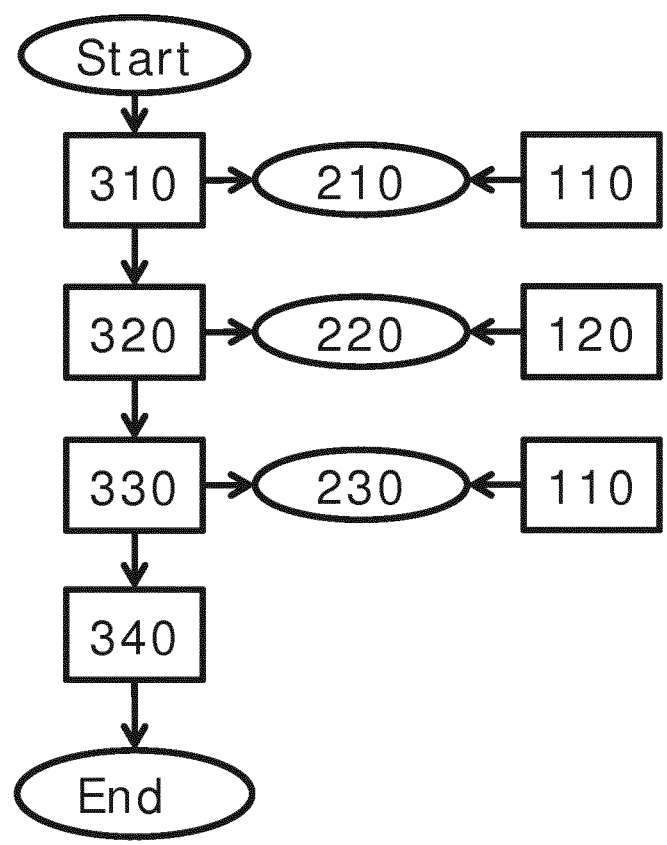
FIG. 1 shows a schematic flow diagram of a proposed method according to an exemplary embodiment of the invention.

FIG. 1 shows a flow diagram of a method for setting up and operating a multiple communication link in a wireless communication apparatus 100, the wireless communication apparatus 100 comprising a first wireless transceiver 110, and a second wireless transceiver 120; the method comprising: Setting up 310 a first communication link 210 according to an IEEE standard 802.15.1 by means of the first wireless transceiver 110. Setting up 320 a second communication link 220 according to an IEEE standard 802.11 by means of the second wireless transceiver 120. Setting up 330 a third communication link 230 according to an IEEE standard 802.15.1, by means of the first wireless transceiver 110, on the channel of the second communication link 220. And simultaneous operation 340 of the first communication link 210, the second communication link 220 and the third communication link 230, wherein the second communication link 220 and the third communication link 230 are operated on the same channel.

Figure 2:
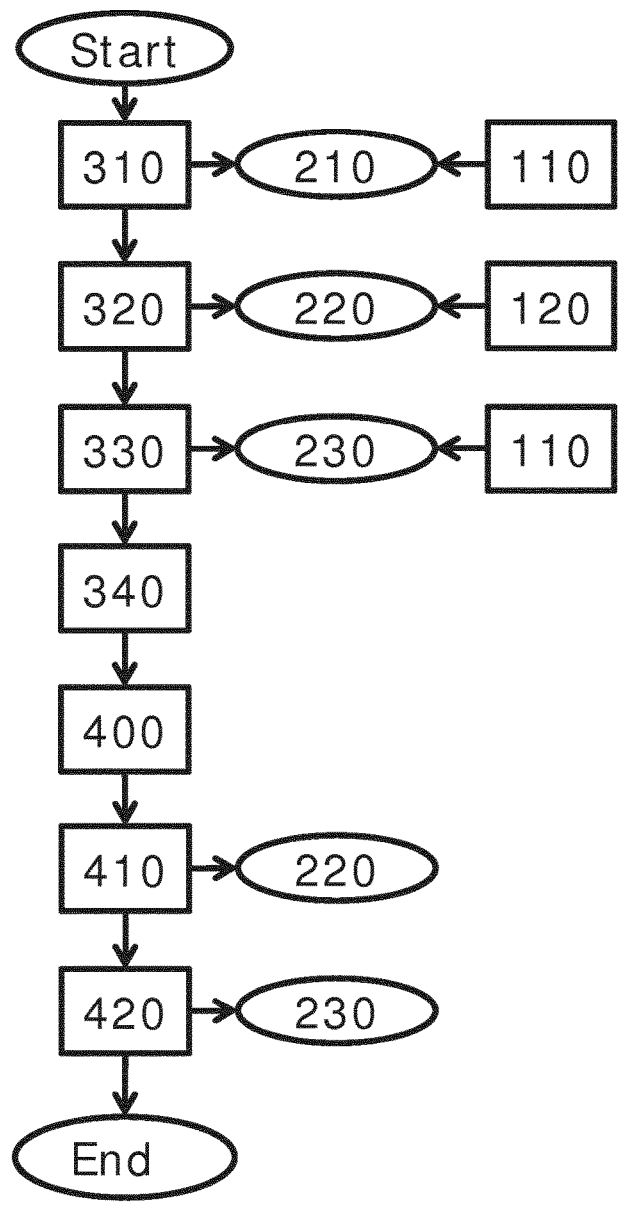
FIG. 2 shows a schematic flow diagram of a proposed method according to a further exemplary embodiment of the invention.

FIG. 2 shows a flow diagram of a method that is broadened relative to the method of FIG. 1. What has been said earlier regarding FIG. 1 applies correspondingly for FIG. 2.

FIG. 2 shows that the method furthermore comprises splitting 400 a transmission capacity of the same channel on which the second communication link 220 and the third communication link 230 are operated simultaneously, into a first sub-channel with a first partial capacity and into a second sub-channel with a second partial capacity. Assigning 410 the first sub-channel to the second communication link 220. And assigning 420 the second sub-channel to the third communication link 230.

Figure 3:
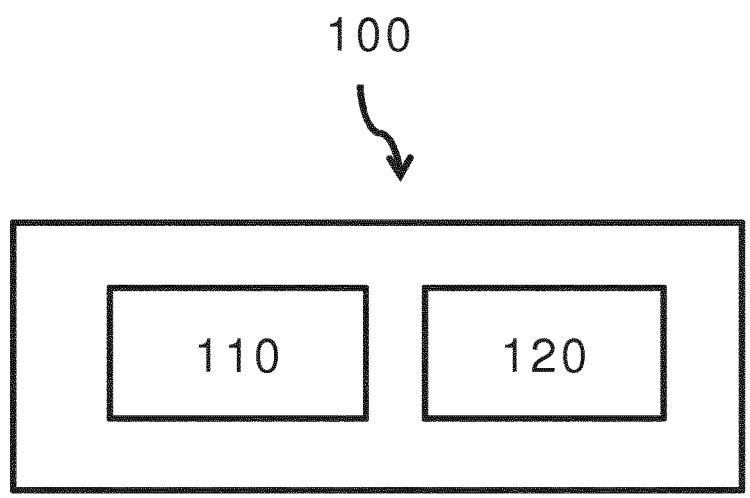
FIG. 3 shows a schematic representation of a wireless communication apparatus according to the invention.

FIG. 3 shows a wireless communication apparatus 100, comprising a first wireless transceiver 110 and a second wireless transceiver 120. Thus, the communication apparatus 100 is set up to execute any one method according to the invention. Thus, the first wireless transceiver 110 is set up for operation according to an IEEE standard 802.15.1 and according to Bluetooth 3.0 or higher. The second wireless transceiver 120 is set up for operation according to an IEEE standard 802.11.

The idea of the invention can be summarized as follows: A method, and a device to that effect, are provided, which facilitate that an apparatus comprising two wireless transceivers, one of which can be operated according to an IEEE standard 802.11 and a further one that can be operated according to an IEEE standard 802.15.1 and according to Bluetooth 3.0 or higher, can simultaneously set up and maintain a Bluetooth link and two WLAN links, which can facilitate higher data transfer rates for the apparatus.

LIST OF REFERENCE SYMBOLS

100 Wireless communication apparatus
110 First wireless transceiver
120 Second wireless transceiver
210 First communication link
220 Second communication link
230 Third communication link
310 Setting up a first communication link
320 Setting up a second communication link
330 Setting up a third communication link
340 Simultaneous operation of the first communication link, the second communication link, and the third communication link
400 Splitting a transmission capacity
410 Assigning the first sub-channel to the second communication link
420 Assigning the second sub-channel to the third communication link The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for setting up and operating a multiple communication link in a wireless communication apparatus that includes a first wireless transceiver and a second wireless transceiver, the method comprising the acts of:
    setting up a first communication link according to an IEEE standard 802.15.1 using the first wireless transceiver;
    setting up a second communication link according to an IEEE standard 802.11 using the second wireless transceiver;
    setting up a third communication link according to an IEEE standard 802.15.1 using the first wireless transceiver, on a channel of the second communication link;
    operating simultaneously the first communication link, the second communication link and the third communication link, wherein the second communication link and the third communication link are both simultaneously operated on said channel of the second communication link;
    splitting a transmission capacity of said channel of the second communication link, on which both the second communication link and the third communication link are operated simultaneously, into a first sub-channel with a first partial capacity and into a second sub-channel with a second partial capacity;
    assigning the first sub-channel to the second communication link; and
    assigning the second sub-channel to the third communication link.

2. The method according to claim 1, wherein the first communication link is operated according to a Bluetooth standard 2.1 or less.

3. The method according to claim 2, wherein the third communication link is operated on an additional high speed channel on a wireless local area network.

4. The method according to claim 1, wherein the third communication link is operated according to a Bluetooth standard that supports establishing an additional wireless local area network transmission channel.

5. The method according to claim 2, wherein the third communication link is operated according to a Bluetooth standard that supports establishing an additional wireless local area network transmission channel.

6. The method according to claim 1, wherein the third communication link is operated on an additional high speed channel on a wireless local area network.

7. A wireless communication apparatus, comprising:
a first wireless transceiver; and
a second wireless transceiver, wherein
the communication apparatus is configured to:
    set up a first communication link according to an IEEE standard 802.15.1 using the first wireless transceiver;
    set up a second communication link according to an IEEE standard 802.11 using the second wireless transceiver;
    set up a third communication link according to an IEEE standard 802.15.1 using the first wireless transceiver, on a channel of the second communication link;
    operate simultaneously the first communication link, the second communication link and the third communication link, wherein the second communication link and the third communication link are both simultaneously operated on said channel of the second communication link;
    split a transmission capacity of said channel of the second communication link, on which both the second communication link and the third communication link are operated simultaneously, into a first sub-channel with a first partial capacity and into a second sub-channel with a second partial capacity;
    assign the first sub-channel to the second communication link; and
    assign the second sub-channel to the third communication link.

8. The wireless communication apparatus according to claim 7, wherein the first wireless transceiver is operated according to an IEEE standard 802.15.1.

9. The wireless communication apparatus according to claim 8, wherein the first wireless transceiver operated according to a Bluetooth standard that supports establishing an additional wireless local area network transmission channel.

10. The wireless communication apparatus according to claim 7, wherein the second wireless transceiver is operated according to an IEEE standard 802.11.

11. A motor vehicle, comprising:
a wireless communication apparatus, wherein the wireless communication apparatus includes a first wireless transceiver and a second wireless transceiver, wherein the communication apparatus is configured to:
set up a first communication link according to an IEEE standard 802.15.1 using the first wireless transceiver;
set up a second communication link according to an IEEE standard 802.11 using the second wireless transceiver;
set up a third communication link according to an IEEE standard 802.15.1 using the first wireless transceiver, on a channel of the second communication link;
operate simultaneously the first communication link, the second communication link and the third communication link, wherein the second communication link and the third communication link are both simultaneously operated on said channel of the second communication link;
split a transmission capacity of said channel of the second communication link, on which both the second communication link and the third communication link are operated simultaneously, into a first sub-channel with a first partial capacity and into a second sub-channel with a second partial capacity;
assign the first sub-channel to the second communication link; and
assign the second sub-channel to the third communication link.

* * * * *